US011568247B2

(12) United States Patent
Kadav et al.

(10) Patent No.: US 11,568,247 B2
(45) Date of Patent: Jan. 31, 2023

(54) EFFICIENT AND FINE-GRAINED VIDEO RETRIEVAL

(71) Applicant: NEC Laboratories America, Inc., Princeton, NJ (US)

(72) Inventors: Asim Kadav, Mountain View, CA (US); Iain Melvin, Princeton, NJ (US); Hans Peter Graf, South Amboy, NJ (US); Meera Hahn, Atlanta, GA (US)

(73) Assignee: NEC Corporation

( * ) Notice: Subject to any disclaimer, the term of this patent is extended or adjusted under 35 U.S.C. 154(b) by 410 days.

(21) Appl. No.: 16/819,513

(22) Filed: Mar. 16, 2020

(65) Prior Publication Data

US 2020/0302294 A1 Sep. 24, 2020

Related U.S. Application Data

(60) Provisional application No. 62/822,170, filed on Mar. 22, 2019.

(51) Int. Cl.
*G06N 3/08* (2006.01)
*G06N 3/04* (2006.01)
(Continued)

(52) U.S. Cl.
CPC ............ *G06N 3/08* (2013.01); *G06F 16/243* (2019.01); *G06F 16/71* (2019.01); *G06F 40/40* (2020.01);
(Continued)

(58) Field of Classification Search
CPC ...... G06N 3/08; G06N 3/0445; G06N 3/0454; G06N 3/0481; G06N 3/006; G06F 16/243;
(Continued)

(56) References Cited

U.S. PATENT DOCUMENTS 10,803,055 B2 * 10/2020 Sirotkovic ............. G06N 3/084
2006/0129458 A1 * 6/2006 Maggio ............. G06Q 30/0218
705/14.2
(Continued)

FOREIGN PATENT DOCUMENTS

WO 2018127627 A1 7/2018

OTHER PUBLICATIONS

Gao, Jiyang, et al. "Tall: Temporal activity localization via language query." Proceedings of the IEEE international conference on computer vision. 2017 (Year: 2017).*

(Continued)

*Primary Examiner* — Daniel C Washburn
*Assistant Examiner* — Athar N Pasha
(74) *Attorney, Agent, or Firm* — Joseph Kolodka

(57) ABSTRACT

A computer-implemented method executed by at least one processor for performing mini-batching in deep learning by improving cache utilization is presented. The method includes temporally localizing a candidate clip in a video stream based on a natural language query, encoding a state, via a state processing module, into a joint visual and linguistic representation, feeding the joint visual and linguistic representation into a policy learning module, wherein the policy learning module employs a deep learning network to selectively extract features for select frames for video-text analysis and includes a fully connected linear layer and a long short-term memory (LSTM), outputting a value function from the LSTM, generating an action policy based on the encoded state, wherein the action policy is a probabilistic distribution over a plurality of possible actions given the encoded state, and rewarding policy actions that return clips matching the natural language query.

18 Claims, 6 Drawing Sheets

(51) Int. Cl.
*G06F 16/242* (2019.01)
*G06F 16/71* (2019.01)
*G06F 40/40* (2020.01)
*H04N 21/44* (2011.01)
*G06Q 50/26* (2012.01)

(52) U.S. Cl.
CPC ......... *G06N 3/0445* (2013.01); *G06N 3/0454* (2013.01); *G06N 3/0481* (2013.01); *H04N 21/44008* (2013.01); *G06Q 50/265* (2013.01)

(58) Field of Classification Search
CPC ........ G06F 16/71; G06F 40/40; G06F 16/783; G06F 40/30; H04N 21/44008; G06Q 50/265

See application file for complete search history.

(56) References Cited

U.S. PATENT DOCUMENTS

| | | |
|---|---|---|
| 2017/0124432 A1 | 5/2017 | Chen et al. |
| 2017/0127016 A1* | 5/2017 | Yu ........................... G06V 10/82 |
| 2020/0012725 A1* | 1/2020 | Li ........................... G06V 20/41 |
| 2020/0073969 A1* | 3/2020 | Kursar .................. G06V 20/56 |
| 2020/0204848 A1* | 6/2020 | Johnson ................. H04N 7/188 |
| 2020/0257902 A1* | 8/2020 | Yao ...................... G06V 10/454 |

OTHER PUBLICATIONS

Yinzheng Gu, Chuanpeng Li, Jinbin Xie, "Attention-Aware Generalized Mean Pooling for Image Retrieval" 2019 (Year: 2019).*

Gao et al., "TALL: Temporal Activity Localization via Language Query", arXiv:1705.02101v2 (cs.CV] Aug. 3, 2017. pp. 1-10.

Hendricks et al., "Localizing Moments in Video with Temporal Language", Proceedings of the 2018 Conference on Empirical Methods in Natural Language Processing. Oct. 31-Nov. 4, 2018.. pp. 1-11.

* cited by examiner

EFFICIENT AND FINE-GRAINED VIDEO RETRIEVAL

RELATED APPLICATION INFORMATION

This application claims priority to Provisional Application No. 62/822,170, filed on Mar. 22, 2019, incorporated herein by reference in its entirety.

BACKGROUND

Technical Field

The present invention relates to neural networks and, more particularly, to improving mini-batching performance in deep learning by improving cache utilization.

Description of the Related Art

Achieving deep understanding videos has long been a key goal in the computer vision community. With the growing number of videos with weak or non-existent labels online, and as a video becomes the primary medium of communication in society, the need for fine-grained video understanding has only increased. The goals of research in this area have wide-ranging applications in video retrieval, categorization, and search. Additionally, there are applications for security, as video is used for personal and surveillance cameras where it is often necessary to be able to efficiently sift through large amounts of video content to detect and retrieve specific events.

SUMMARY

A computer-implemented method executed by at least one processor for performing mini-batching in deep learning by improving cache utilization is presented. The method includes temporally localizing a candidate clip in a video stream based on a natural language query, encoding a state, via a state processing module, into a joint visual and linguistic representation, feeding the joint visual and linguistic representation into a policy learning module, wherein the policy learning module employs a deep learning network to selectively extract features for select frames for video-text analysis and includes a fully connected linear layer and a long short-term memory (LSTM), outputting a value function from the LSTM, generating an action policy based on the encoded state, wherein the action policy is a probabilistic distribution over a plurality of possible actions given the encoded state, and rewarding policy actions that return clips matching the natural language query.

A system for performing mini-batching in deep learning by improving cache utilization is also presented. The system includes a memory and a processor in communication with the memory, wherein the processor is configured to temporally localize a candidate clip in a video stream based on a natural language query, encode a state, via a state processing module, into a joint visual and linguistic representation, feed the joint visual and linguistic representation into a policy learning module, wherein the policy learning module employs a deep learning network to selectively extract features for select frames for video-text analysis and includes a fully connected linear layer and a long short-term memory (LSTM), output a value function from the LSTM, generate an action policy based on the encoded state, wherein the action policy is a probabilistic distribution over a plurality of possible actions given the encoded state, and reward policy actions that return clips matching the natural language query.

A non-transitory computer-readable storage medium comprising a computer-readable program is presented for performing mini-batching in deep learning by improving cache utilization, wherein the computer-readable program when executed on a computer causes the computer to perform the steps of temporally localizing a candidate clip in a video stream based on a natural language query, encoding a state, via a state processing module, into a joint visual and linguistic representation, feeding the joint visual and linguistic representation into a policy learning module, wherein the policy learning module employs a deep learning network to selectively extract features for select frames for video-text analysis and includes a fully connected linear layer and a long short-term memory (LSTM), outputting a value function from the LSTM, generating an action policy based on the encoded state, wherein the action policy is a probabilistic distribution over a plurality of possible actions given the encoded state, and rewarding policy actions that return clips matching the natural language query.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
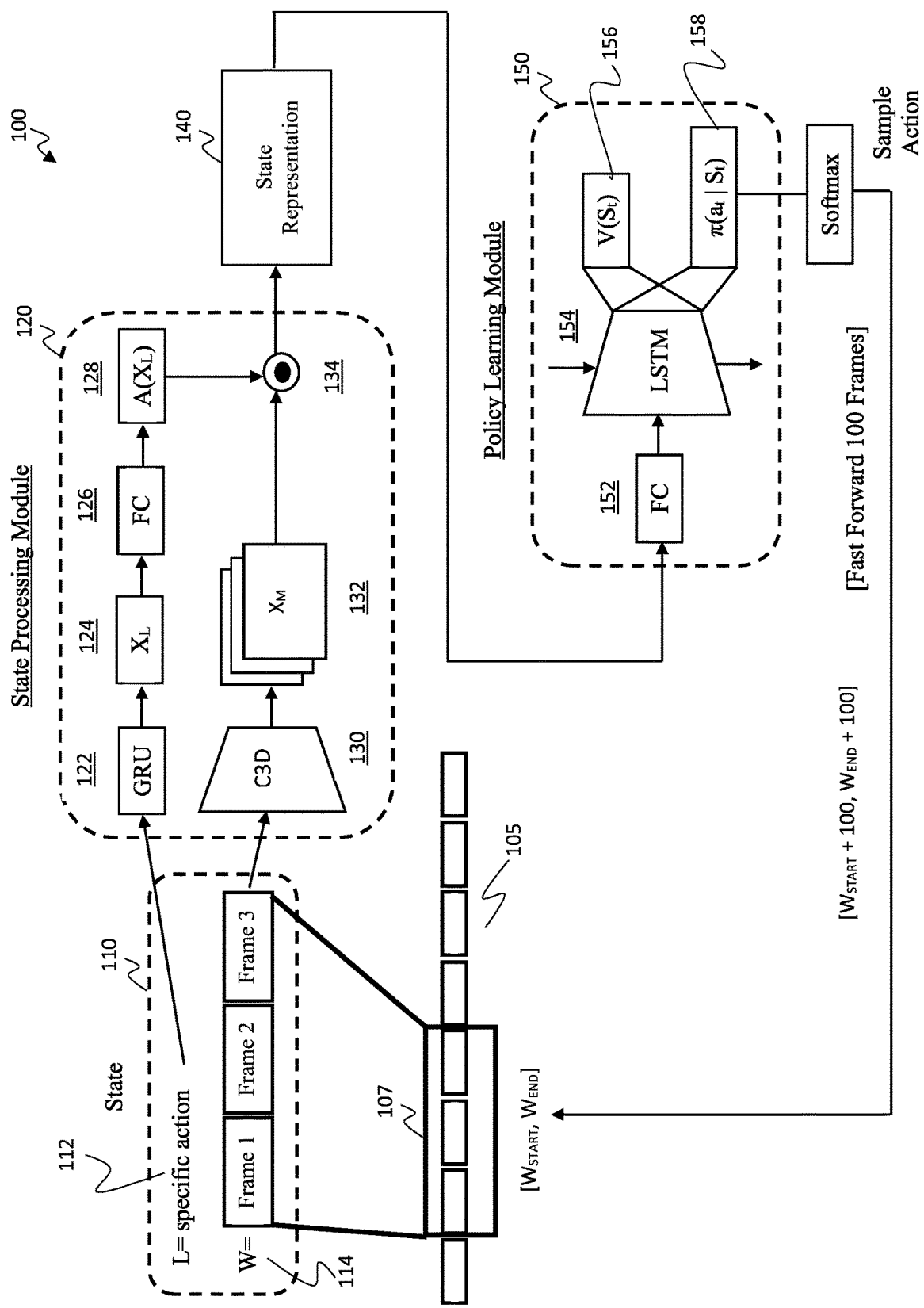
FIG. 1 is a block/flow diagram illustrating a video retrieval system, in accordance with embodiments of the present invention.

A neural network may include a plurality of layers. For example, the neural network may include an input layer, a hidden layer, and an output layer. The input layer may receive an input to be used to perform training and transmit the input to the hidden layer, and the output layer may generate an output of the neural network based on signals received from nodes of the hidden layer. The hidden layer may be disposed between the input layer and the output layer. The hidden layer may change training data received from the input layer to an easily predictable value. Nodes included in the input layer and the hidden layer may be connected to each other through edges having connection weights, and nodes included in the hidden layer and the output layer may also be connected to each other through edges having connection weights. The input layer, the hidden layer, and the output layer may respectively include a plurality of nodes.

The neural network may include a plurality of hidden layers. A neural network including the plurality of hidden layers may be referred to as a deep neural network. Training the deep neural network may be referred to as deep learning. Nodes included in the hidden layers may be referred to as hidden nodes. The number of hidden layers provided in a deep neural network is not limited to any particular number.

The neural network may be trained through supervised learning. Supervised learning refers to a method of providing input data and output data corresponding thereto to a neural network and updating connection weights of edges so that the output data corresponding to the input data may be output. For example, a model training apparatus may update connection weights of edges among artificial neurons through a delta rule and error back-propagation learning.

Error back-propagation learning refers to a method of estimating a loss with respect to input data provided through forward computation, and updating connection weights to reduce a loss in a process of propagating the estimated loss in a backward direction from an output layer toward a hidden layer and an input layer. Processing of the neural network may be performed in an order of the input layer, the hidden layer, and the output layer. However, in the error back-propagation learning, the connection weights may be updated in an order of the output layer, the hidden layer, and the input layer. Hereinafter, according to an exemplary embodiment, training a neural network refers to training parameters of the neural network. Further, a trained neural network refers to a neural network to which the trained parameters are applied.

Regarding the exemplary embodiments of the present invention, localizing moments in untrimmed videos via language queries is a task that demands an ability to accurately ground language into video. Previous works have approached this task by processing the entire video, often more than once, to localize relevant activities. In real-world applications that this task lends itself to, such as surveillance, efficiency is a pivotal trait of a system. The exemplary embodiments of the present invention present TripNet, an end-to-end system that uses a gated attention architecture to model fine-grained textual and visual representations in order to align text and video content. Furthermore, TripNet uses reinforcement learning to efficiently localize relevant activity clips in long videos, by learning how to intelligently skip around the video. TripNet extracts visual features for a few frames to perform activity classification.

The challenge of executing an efficient search is addressed through a combination of reinforcement learning (RL) and fine-grained video analysis. The exemplary approach is inspired in part by strategies used by human video annotators. In addition, an analogy is made to the success of RL in language-guided navigation tasks in 3D environments. Specifically, an analogy is made between temporally localizing events in a video stream through playback controls and the actions an agent would take to navigate around an environment looking for a specific object of interest. The fact that labeled data is not available for explicitly modeling the relationship between actions and rewards is shared with the navigation task, but it is possible to learn a model through simulation. The exemplary approach to temporal localization uses a novel architecture for combining the multi-modal video and text features with a policy learning module that learns to step forward and rewind the video and receives awards for accurate temporal localization.

Thus, the exemplary embodiments present a novel end-to-end reinforcement learning framework referred to as TripNet that addresses the problem of temporal activity localization via language query. TripNet uses gated-attention to align text and visual features, thus improving accuracy. Moreover, the exemplary embodiments of the present invention introduce an efficient video retrieval system that allows a user to query a video using natural language sentences to return the frames in the video where an action or an event may have occurred. The video retrieval system can efficiently search the video without going over all the frames and return a response to the user. In practice, machine learning model training processes data examples in batches to improve training performance. Instead of processing a single data example and training and updating the model parameters, one can train over a batch of samples to calculate an average gradient and then update the model parameters. However, computing a mini-batch over multiple samples can be slow and computationally efficient. The exemplary embodiments of the present invention introduce a mechanism for efficient mini-batching. The exemplary embodiments of the present invention present a solution to improve mini-batching performance in deep learning (neural networks) by improving cache utilization.

As noted above, TripNet 100 is an end-to-end reinforcement learning method for localizing and retrieving temporal activities in videos given a natural language query. TripNet 100 can be divided into two components, that is, a state processing module 120 and a policy learning module 150. The state processing module 120 creates a visual-linguistic encoding of the current state and passes the visual-linguistic encoding to the policy learning module 150, which generates an action policy.

In FIG. 1, TripNet 100 localizes specific moments in videos or video streams based on a natural language query 112. As noted, there are two components of TripNet 100, that is, the state processing module 120 and the policy learning module 150. The state processing module 120 encodes the state into a joint visual and linguistic representation which is then fed to the policy learning module 150 on which it generates the action policy. The sampled action in FIG. 1 is skipping forward by j frames and the state is updated accordingly.

The localization problem that is solved is defined as follows:

Given an untrimmed video V (105) and a language query L (112), the goal is to temporally localize the specific clip W (114) in V (105), which is described by L (112). In other words, the untrimmed video 105 is denoted as V= $\{V_{n=i}, \ldots V_{n=k}\}$ where N is the number of frames in the video 105.

What is desired to be found is: W=$\{V_{n=i}, \ldots V_{n=k}\}$ that corresponds best to L (112).

It is possible to solve this problem efficiently because videos have an inherent temporal structure, such that an observation made at frame n conveys information about frames both in the past and in the future. Some challenges of the problem are, how to encode the uncertainty in the location of the target event in a video, and how to update the uncertainty from successive observations. While a Bayesian formulation could be employed, the measurement and update model would need to be learned and supervision for this is not available.

Since it is computationally feasible to simulate the search process (in fact it is only a one-dimensional space, in contrast to standard navigation tasks), the exemplary system adopts a reinforcement learning (RL) approach. Motivation is found from human annotators who observe a short clip and make a decision to skip forward or backward in the video by some number of frames, until the annotators can narrow down the frames to the target clip. The exemplary system emulates this sequential decision process by using RL.

Thus, by using RL, the exemplary system trains an agent that can steer a fixed sized window around the video to find W (114) without looking at all frames of V (105). The exemplary system employs an actor-critic method (A3C) to learn the policy $\pi$ that maps (V, L) $\rightarrow$ W. The intuition is that the agent will take large jumps around the video until the agent finds visual features that identify proximity to L (112), and then the agent will start to take smaller steps as it narrows in on the target clip.

At each time step, the agent observes the current state 110, which includes the sentence L (112) and a candidate clip (114) of the video (105). The clip is defined by a bounding window [$W_{start}$, $W_{end}$] (107) where start and end are frame numbers. At time step t=0, the bounding window 107 is set to [0, X], where X is the average length of annotated clips within the dataset. This window size is fixed and does not change. At each time step, the state processing module 120 creates a state representation vector 140, which is fed into the policy learning module 150, on which it generates an action policy. This policy is a distribution over all the possible actions. An action is then sampled according to the policy.

The action space includes, e.g., 7 predefined actions: move the entire bounding window $W_{start}$, $W_{end}$ forward or backward by h frames, j frames, or 1 second of frames or TERMINATE. Where h=N=10 and j=N=5. These navigation steps make aligning the visual and text features easier. Making the RL agent explicitly learn the window size significantly increases the state space and leads to a drop-in accuracy and efficiency with the current framework. However, an additional function to adjust box width over the fixed window size can be learned, analogous to the refinement of anchor boxes used in object detectors. These actions were chosen so that the amount of movement is proportional to the length of the video. If the bounding window is at the start or end of the full video and an action is chosen that would push the bounding window outside the video's length, the bounding window remains the same as the previous time step. The action TERMINATE ends the search and returns the clip of the current state as the video clip predicted to be best matched to L.

At each time step, the state-processing module 120 takes the current state 110 as an input and outputs a joint-representation 140 of the input video clip 114 and the sentence query L (112). The joint representation 140 is used by the policy learner 150 to create an action policy over which the optimal action to take, is sampled. The clip 114 is fed into a three-dimensional convolution network (C3D) 130 to extract the spatio-temporal features from the fifth convolutional layer. The C3D features are mean-pooled across frames and the result is denoted as 132 or $x_M$.

To encode the sentence query, L (112) is passed through a Gated Recurrent Unit (GRU) (122), which outputs a vector 124 or vector $x_L$. The exemplary system then transforms the query embedding into an attention vector 128 that can be applied to the video embedding. To do so, the sentence query embedding $X_L$ is passed through a fully connected linear layer 126 with a sigmoid activation function. The output of this layer is expanded to be the same dimension of $X_M$. The output of the linear layer is called the attention vector, $att_L$ and $x_M$. The exemplary system performs a Hadamard multiplication 134 between $att_L$ and $x_M$, and the result is output as the state representation, 140, $s_t$. This attention unit is the gated attention architecture for activity localization. Hence, the gated attention unit is designed to gate specific filters based on the attention vector from the language query (112). The gating mechanism allows the model to focus on specific filters that can attend to specific objects, and their attributes, from the query description.

Also, an additional baseline using a simple concatenation operation between the video and text representations to demonstrate the effectiveness of the gated-attention architecture can be used. In the instant case, the exemplary system only performs self-attention over the mean pooled C3D features. Then, the exemplary system can take a Skip-Thought encoding of the sentence query and concatenate it with the features of the video frames to produce the state representation.

Regarding the policy learning module 150, an actor-critic method can be employed to model the sequential decision process of grounding the language query to a temporal video location. The policy learning module 150 employs a deep neural network to learn the policy and value functions. The network includes a fully connected linear layer 152 followed by a long short-term memory (LSTM) 154, which is followed by a fully connected layer to output the value function, 156, $v(s_t|\theta_v)$, and fully connected layer to output the policy, 158, $\pi(a_t|s_t,\theta_\pi)$, for state, $s_t$ and action, $a_t$ at time t, $\theta_v$ is the critic branch parameters and $\theta_\pi$ is the actor branch parameters.

The policy, $\pi$, is a probabilistic distribution over all possible actions given the current state. Since the exemplary system is attempting to model a sequential problem, the exemplary system uses an LSTM so that the system can have memory of the previous states which will inevitably positively impact the future actions. Specifically, the exemplary system uses the asynchronous actor-critic method known as A3C with Generalized Advantage Estimation that reduces policy gradient variance. The method runs multiple parallel threads that each run their own episodes and updates global network parameters at the end of the episode.

Since the goal is to learn a policy that returns the best matching clip, the exemplary system wants to reward actions that bring the bounding windows [$W_{start}$, $W_{end}$] closer to the bounds of the ground truth clip. Hence, the action to take, should return a state that has a clip with more overlap with the ground-truth than the previous state. Therefore, the exemplary system uses reward shaping by having the reward be the difference of potentials between the previous state and current state. However, the exemplary system wants to ensure the agent is taking an efficient number of jumps and not excessively sampling the clip. In order to encourage this behavior, the exemplary system gives a small negative reward in proportion with the total number of steps thus far. As a result, the agent is encouraged to find the clip window as quickly as possible.

Trial and error was employed to find the optimal negative reward factor $\beta$. It was found that using a negative reward factor results in the agent taking more actions with larger frame jumps.

Hence, the reward at any time step t is calculated as follows:

$$\text{reward}_t = (IOU_t(s_t) - IOU_t(s_t-1)) - \beta * t \quad (1)$$

where β is set to 0.01. The IOU is calculated between the clip of the state at time t, $[W_{start}^t, W_{end}^t]$, and the ground truth clip for sentence L, $[G_{start}, G_{end}]$ as follows:

$$IOU_t = \frac{\min(W_{end}^t, G_{end}) - \max(W_{start}^t, G_{start})}{\max(W_{end}^t, G_{end}) - \min(W_{start}^t, G_{start})} \quad (2)$$

The common loss functions for A3C are used for the value and policy loss. For training the value function, the exemplary system sets the value loss to the mean squared loss between the discounted reward sum and the estimated value.

$$Loss_{value} = \sum_t (R_t - v(s_t | \theta_v))^2 * \gamma_1, \quad (3)$$

where γ1 is set to 0.5 and $R_t$ is the accumulated reward.

For training the policy function, the policy gradient loss is employed:

$$Loss_{policy} = -\sum_t \log(\pi(a_t | s_t, \theta_\pi)) * GAE(s_t) - \gamma_0 * H(\pi(a_t | s_t, \theta_\pi)), \quad (4)$$

where GAE is the generalized advantage estimation function, H is the calculation of entropy and γ0 is set to 0.5.

Therefore, the total loss for the policy learning module is:

$$Loss = Loss_\pi + \gamma_1 + Loss_v \quad (5)$$

Figure 2:
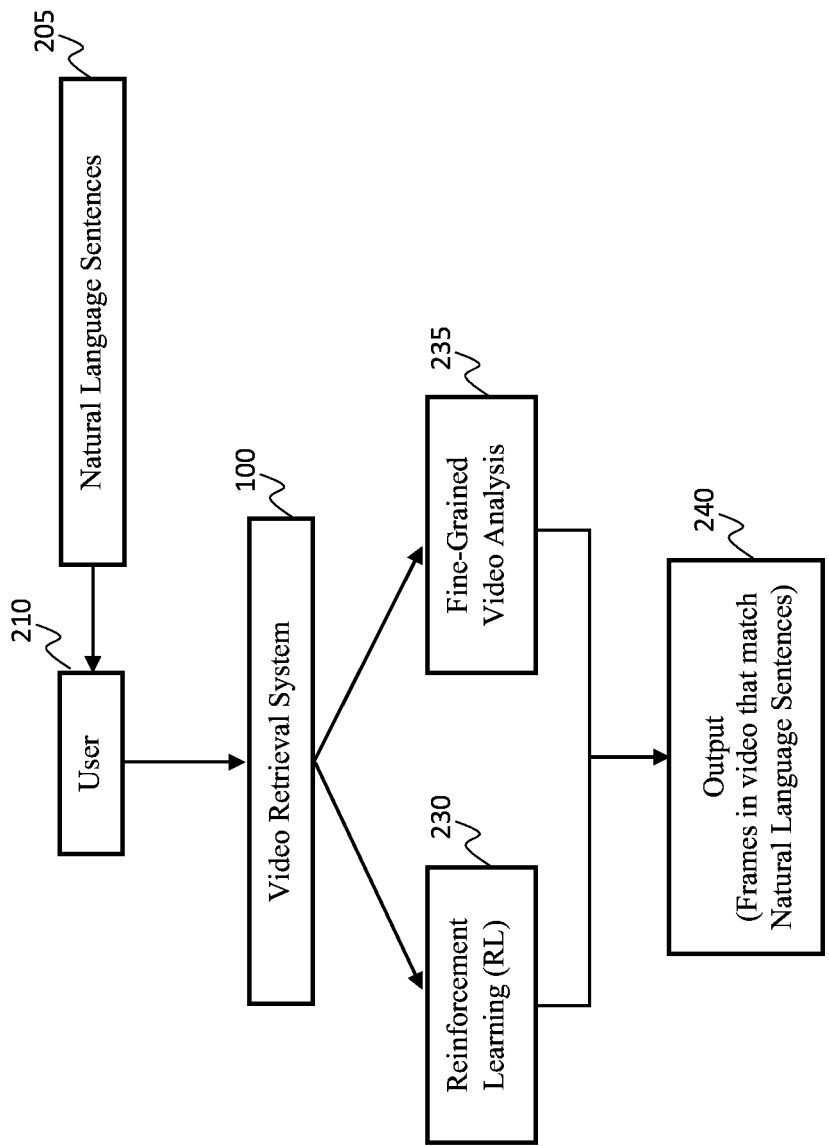
FIG. 2 is a block/flow diagram illustrating the reinforcement learning and fine-grained video analysis components of the video retrieval system, in accordance with embodiments of the present invention.

FIG. 2 is a block/flow diagram illustrating the reinforcement learning and fine-grained video analysis components of the video retrieval system, in accordance with embodiments of the present invention.

A user 210 can input natural language sentences 205 into the video retrieval system 100. The video retrieval system 100 implements reinforcement learning 230 and fine-grained video analysis 235 to receive output 240. Output 240 includes the frames that match the natural language sentences 205 inputted by the user 210.

Figure 3:
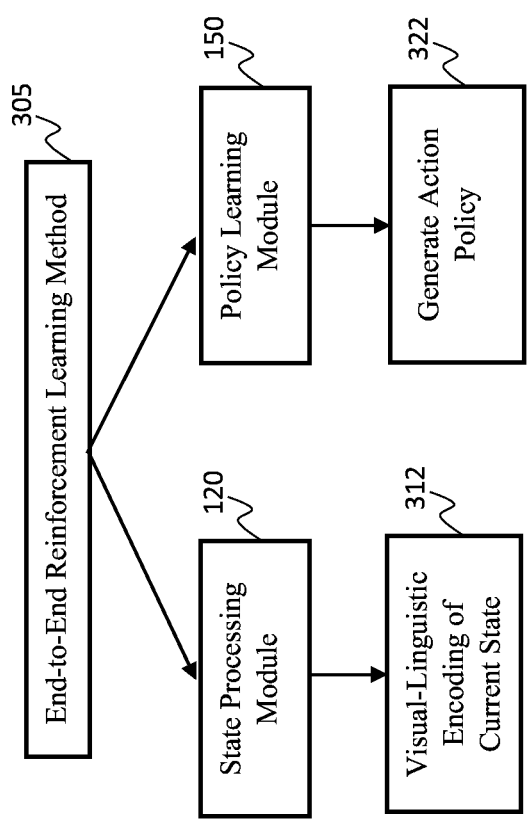
FIG. 3 is a block/flow diagram illustrating the components of the end-to-end reinforcement learning method, in accordance with embodiments of the present invention.

FIG. 3 is a block/flow diagram illustrating the components of the end-to-end reinforcement learning method, in accordance with embodiments of the present invention.

The end-to-end reinforcement learning method 305 includes the state learning module 120 and the policy learning module 150. The state processing module 120 is employed for visual-linguistic encoding 312 of the current state. The policy learning module 150 is employed to generate an action policy 322.

Figure 4:
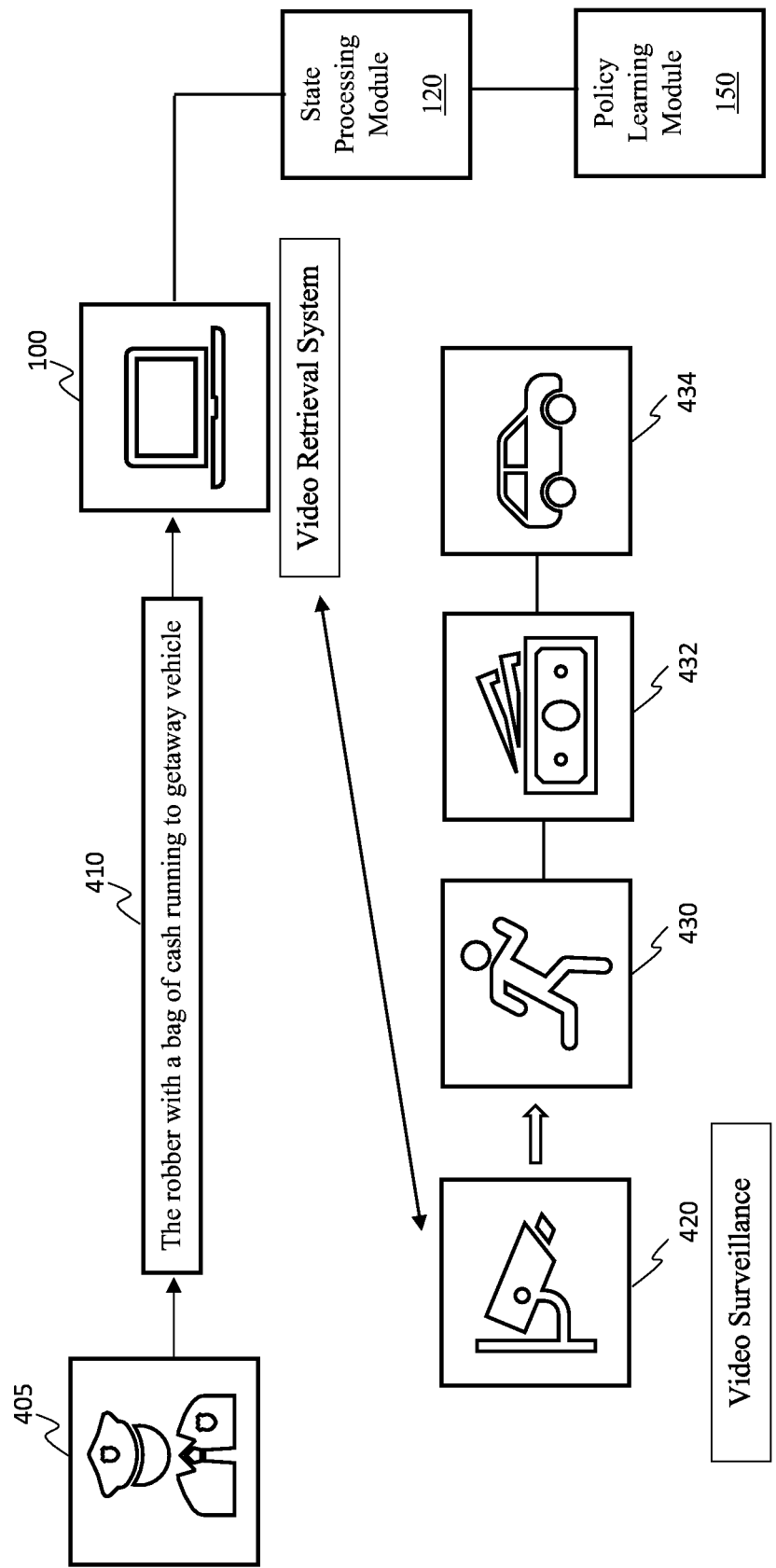
FIG. 4 is a block/flow diagram illustrating a practical application for apprehending a criminal suspect via the video retrieval system of FIG. 1, in accordance with embodiments of the present invention.

FIG. 4 is a block/flow diagram illustrating a practical application for apprehending a criminal suspect via the video retrieval system of FIG. 1, in accordance with embodiments of the present invention.

In one example, law enforcement 405, e.g., a police officer, may want to browse through a video stream captured by a camera 420 to find a suspect that was seen with a bag of cash fleeing into a getaway car. The camera 420 is located outside, e.g., a bank. Camera 420, located outside the bank, may haven taken a video of the person 430 running out of the bank. The video stream obtained by the camera 420 can be analyzed to find such features. The video retrieval system 100 can be used to search for a man 430 carrying money 434 running out of a bank and into a car 434. The police officer 405 can initiate the video retrieval system 100 by uttering the phrase, 410, "the robber with a bag of cash running to a getaway car." This is the user query. The video retrieval system 100 can employ the state processing module 120 and the policy leaning module 150 to quickly narrow down the frames in the video stream matching such features 430, 432, 434. Thus, the police officer 405 can quickly find the suspect 430 without having to look through the entire video stream.

Of course, one skilled in the art can contemplate other practical real-world applications for utilizing the video retrieval system 100.

Figure 5:
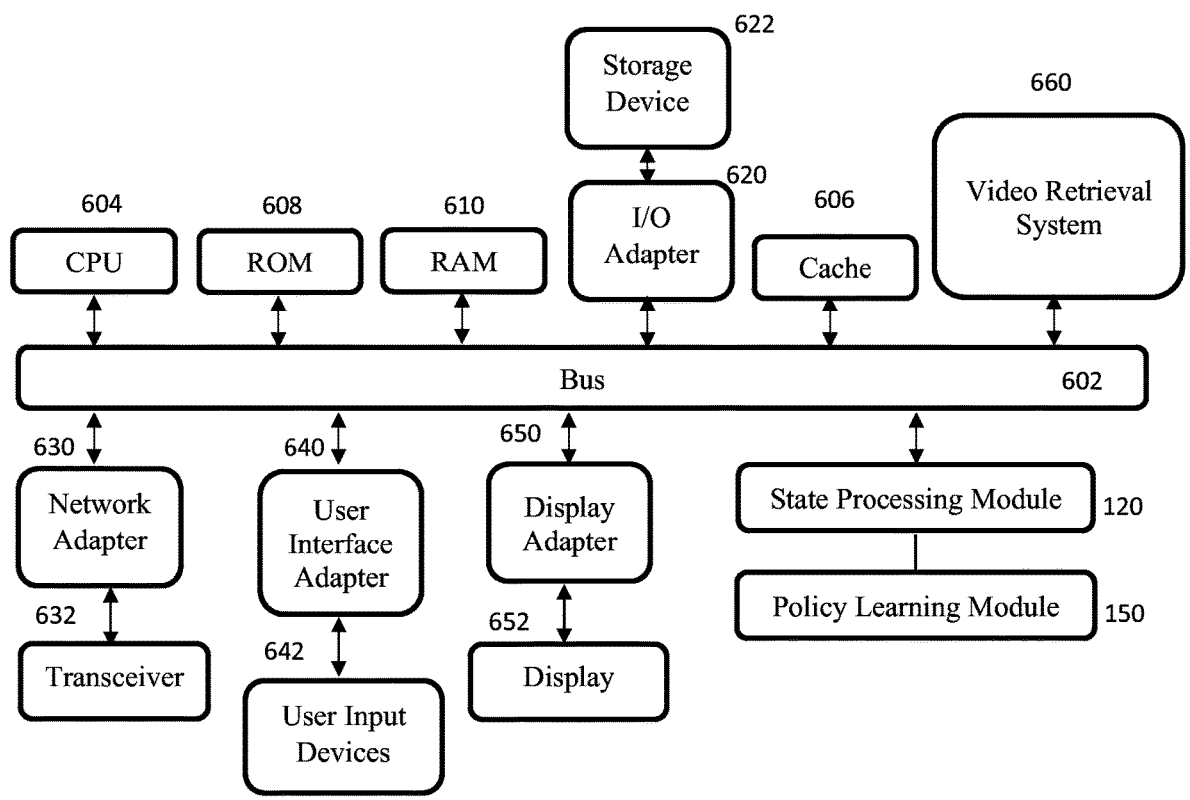
FIG. 5 is an exemplary processing system for employing the video retrieval system, in accordance with embodiments of the present invention.

FIG. 5 is an exemplary processing system for employing the video retrieval system, in accordance with embodiments of the present invention.

The processing system includes at least one processor (CPU) 604 operatively coupled to other components via a system bus 602. A cache 606, a Read Only Memory (ROM) 608, a Random Access Memory (RAM) 610, an input/output (I/O) adapter 620, a network adapter 630, a user interface adapter 640, and a display adapter 650, are operatively coupled to the system bus 602. Additionally, video retrieval system 660 can be employed. The video retrieval system 660 can include a state processing module 120 and a policy learning module 150.

A storage device 622 is operatively coupled to system bus 602 by the I/O adapter 620. The storage device 622 can be any of a disk storage device (e.g., a magnetic or optical disk storage device), a solid-state magnetic device, and so forth.

A transceiver 632 is operatively coupled to system bus 602 by network adapter 630.

User input devices 642 are operatively coupled to system bus 602 by user interface adapter 640. The user input devices 642 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 642 can be the same type of user input device or different types of user input devices. The user input devices 642 are used to input and output information to and from the processing system.

A display device 652 is operatively coupled to system bus 602 by display adapter 650.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 6:
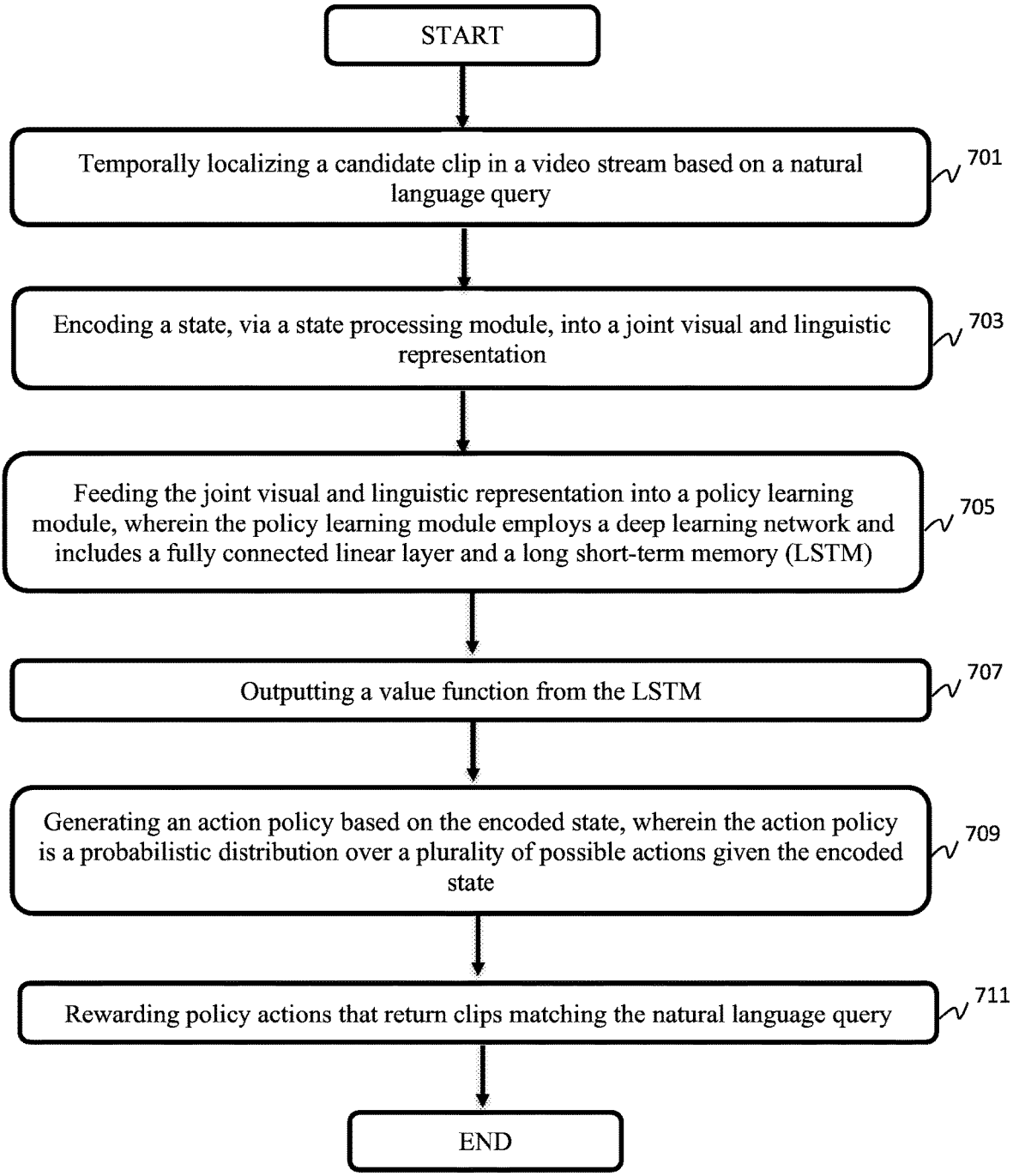
FIG. 6 is a block/flow diagram of a method for employing the video retrieval system of FIG. 1, in accordance with embodiments of the present invention.

FIG. 6 is a block/flow diagram of a method for identifying a person in a video stream through a plurality of ranked features, in accordance with embodiments of the present invention.

At block 701, temporally localize a candidate clip in a video stream based on a natural language query.

At block 703, encode a state, via a state processing module, into a joint visual and linguistic representation.

At block 705, feed the joint visual and linguistic representation into a policy learning module, wherein the policy learning module employs a deep learning network and includes a fully connected linear layer and a long short-term memory (LSTM).

At block 707, output a value function from the LSTM.

At block 709, generate an action policy based on the encoded state, wherein the action policy is a probabilistic distribution over a plurality of possible actions given the encoded state.

At block 711, reward policy actions that return clips matching the natural language query.

In summary, the exemplary embodiments of the present invention disclose a system that uses reinforcement learning and learns to automatically skip around to described actions. Further, by using an attention vector, the system can perform fine-grained grounding of activities based on the natural language text input. The reinforcement learning system includes various "actions" to rewind and fast-forward frames and the system is rewarded for locating scenes that match the natural language text. Over a period of (training) time, the system learns to locate scenes matching the natural language description without going over the entire video. The reinforcement learning method uses policy gradient, which is a type of reinforcement learning that directly parameterizes the policy.

In summary, the exemplary embodiments of the present invention allow for sifting through large amounts of videos (such as in surveillance videos) to produce more accurate results by using attention mechanisms that allow fine-grained visual understanding of the videos. The exemplary system uses reinforcement learning to increase efficiency of the system by only needing to look at, e.g., less than 50% of the video stream in order to make a prediction. In some instances, less than 30% of the video stream needs to be looked at to find a direct match. This reduces the cost of surveillance systems since videos can be retrieved easily.

Moreover, in summary, localizing moments in long, untrimmed videos using natural language queries is a useful and challenging task for fine-grained video retrieval. Existing works often analyze 100% of the video frames. In contrast, the exemplary embodiments of the present invention introduce a system that uses a gated-attention mechanism over cross-modal features to automatically localize a moment in time given a natural language text query with high accuracy. Further, a policy network is employed, thus resulting in an efficient system that on average looks at less than 50% of the video frames to make a prediction.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method executed by at least one processor for performing mini-batching in deep learning by improving cache utilization, the method comprising:
   temporally localizing a candidate clip in a video stream based on a natural language query;
   encoding a state, via a state processing module, into a joint visual and linguistic representation;
   feeding the joint visual and linguistic representation into a policy learning module, wherein the policy learning module employs a deep learning network to selectively extract features for select frames for video-text analysis and includes a fully connected linear layer and a long short-term memory (LSTM);
   outputting a value function from the LSTM;
   generating an action policy based on the encoded state, wherein the action policy is a probabilistic distribution over a plurality of possible actions given the encoded state; and
   rewarding policy actions that return clips matching the natural language query,
   wherein a Hadamard multiplication is performed between an attention vector and a mean-pooled result to generate the joint visual and linguistic representation.

2. The method of claim 1, wherein an agent is trained to guide a fixed-size window around the candidate clip of the video stream to find the clips matching the natural language query.

3. The method of claim 1, wherein the policy learning module learns to fast-forward and rewind the video stream to locate the matching clips.

4. The method of claim 1, wherein the natural language query is encoded by a gated recurrent unit, the gate recurrent unit outputting a query embedding vector.

5. The method of claim 4, wherein the query embedding vector is fed into a fully connected linear layer with a sigmoid activation function.

6. The method of claim 5, wherein an output of the fully connected linear layer is the attention vector.

7. The method of claim 6, wherein the candidate clip of the video stream is fed into a three-dimensional convolution network to extract spatio-temporal features from a fifth convolutional layer.

8. The method of claim 7, wherein the spatio-temporal features are mean-pooled across frames of the video stream to output the mean-pooled result.

9. A system for performing mini-batching in deep learning by improving cache utilization, the system comprising:
   a memory; and
   a processor in communication with the memory, wherein the processor runs program code to:
   temporally localize a candidate clip in a video stream based on a natural language query;
   encode a state, via a state processing module, into a joint visual and linguistic representation;
   feed the joint visual and linguistic representation into a policy learning module, wherein the policy learning module employs a deep learning network to selectively extract features for select frames for video-text analysis and includes a fully connected linear layer and a long short-term memory (LSTM);
   output a value function from the LSTM;
   generate an action policy based on the encoded state, wherein the action policy is a probabilistic distribution over a plurality of possible actions given the encoded state; and
   reward policy actions that return clips matching the natural language query,
   wherein a Hadamard multiplication is performed between an attention vector and a mean-pooled result to generate the joint visual and linguistic representation.

10. The system of claim 9, wherein an agent is trained to guide a fixed-size window around the candidate clip of the video stream to find the clips matching the natural language query.

11. The system of claim 9, wherein the policy learning module learns to fast-forward and rewind the video stream to locate the matching clips.

12. The system of claim 9, wherein the natural language query is encoded by a gated recurrent unit, the gate recurrent unit outputting a query embedding vector.

13. The system of claim 12, wherein the query embedding vector is fed into a fully connected linear layer with a sigmoid activation function.

14. The system of claim 13, wherein an output of the fully connected linear layer is the attention vector.

15. The system of claim 14, wherein the candidate clip of the video stream is fed into a three-dimensional convolution network to extract spatio-temporal features from a fifth convolutional layer.

16. The system of claim 15, wherein the spatio-temporal features are mean-pooled across frames of the video stream to output the mean-pooled result.

17. A non-transitory computer-readable storage medium comprising a computer-readable program for performing mini-batching in deep learning by improving cache utilization, wherein the computer-readable program when executed on a computer causes the computer to perform the steps of:
- temporally localizing a candidate clip in a video stream based on a natural language query;
- encoding a state, via a state processing module, into a joint visual and linguistic representation;
- feeding the joint visual and linguistic representation into a policy learning module, wherein the policy learning module employs a deep learning network to selectively extract features for select frames for video-text analysis and includes a fully connected linear layer and a long short-term memory (LSTM);
- outputting a value function from the LSTM;
- generating an action policy based on the encoded state, wherein the action policy is a probabilistic distribution over a plurality of possible actions given the encoded state; and
- rewarding policy actions that return clips matching the natural language query,
- wherein a Hadamard multiplication is performed between an attention vector and a mean-pooled result to generate the joint visual and linguistic representation.

18. The non-transitory computer-readable storage medium of claim 17,
- wherein the natural language query is encoded by a gated recurrent unit, the gate recurrent unit outputting a query embedding vector;
- wherein the query embedding vector is fed into a fully connected linear layer with a sigmoid activation function, the output of the fully connected linear layer being the attention vector; and
- wherein the candidate clip of the video stream is fed into a three-dimensional convolution network to extract spatio-temporal features from a fifth convolutional layer, the spatio-temporal features mean-pooled across frames of the video stream to output the mean-pooled result.

* * * * *